United States Patent
Jörn et al.

(10) Patent No.: US 12,080,109 B2
(45) Date of Patent: Sep. 3, 2024

(54) PROCESSES FOR OFFSETTING A CARBON FOOTPRINT OF A MULTISTAGE TRIP AND FOR THE LIFECYCLE OF A VEHICLE

(71) Applicant: Airbus Operations GmbH, Hamburg (DE)

(72) Inventors: Paul Jörn, Hamburg (DE); Markus Müller, Friedrichshafen (DE)

(73) Assignee: Airbus Operations GmbH, Hamburg (DE)

( * ) Notice: Subject to any disclaimer, the term of this patent is extended or adjusted under 35 U.S.C. 154(b) by 442 days.

(21) Appl. No.: 16/793,277

(22) Filed: Feb. 18, 2020

(65) Prior Publication Data

US 2021/0256781 A1    Aug. 19, 2021

(51) Int. Cl.
| | | |
|---|---|---|
| G07C 5/02 | (2006.01) | |
| B64F 5/60 | (2017.01) | |
| G01C 21/34 | (2006.01) | |
| G06Q 30/018 | (2023.01) | |
| G06Q 30/0279 | (2023.01) | |

(52) U.S. Cl.
CPC .................. G07C 5/02 (2013.01); B64F 5/60 (2017.01); G01C 21/3469 (2013.01); G06Q 30/018 (2013.01); G06Q 30/0279 (2013.01)

(58) Field of Classification Search
CPC ......... G07C 5/02; B64F 5/60; G01C 21/3469; G06Q 30/018; G06Q 30/0279; G06Q 50/10; G06Q 50/30; G06Q 10/06
See application file for complete search history.

(56) References Cited

U.S. PATENT DOCUMENTS

| | | | |
|---|---|---|---|
| 8,280,646 B2 | 10/2012 | Seidel | |
| 9,248,790 B2 | 2/2016 | Bradley et al. | |
| 2010/0217535 A1 | 8/2010 | Seidel | |
| 2012/0158446 A1* | 6/2012 | Mayerle | G06Q 10/063 705/7.11 |
| 2015/0127391 A1* | 5/2015 | Bellowe | G06Q 10/30 705/5 |

(Continued)

FOREIGN PATENT DOCUMENTS

WO    WO-2020067068 A1 *    4/2020    ............. B60K 35/00

OTHER PUBLICATIONS

Bachmann, et al., Environmental analysis of innovative sustainable composites with potential use in aviation sector—A life cycle assessment review, Science China, 60(9):1301-1317, Aug. 3, 2017 (Year: 2017).*

(Continued)

*Primary Examiner* — Yuen Wong
(74) *Attorney, Agent, or Firm* — Greer, Burns & Crain, Ltd.

(57) ABSTRACT

Processes for determining carbon dioxide emission impact. In one process, a carbon dioxide emission impact is determined for each stage of a multi-stage trip. A traveler may make adjustments to the trip to offset the carbon dioxide emission impact of the entire trip and achieve a desired sustainability level for the trip. In another process, that may be used in the first process, the carbon dioxide emission impact for a vehicle is determined based on the entire life span of the vehicle, including a carbon dioxide emission impact for a production stage, a carbon dioxide emission impact for a usage stage, and a carbon dioxide emission impact for an end of life stage.

6 Claims, 2 Drawing Sheets

(56) References Cited

U.S. PATENT DOCUMENTS

2015/0324807 A1* 11/2015 Pacheco ............... G06Q 30/018
  705/317
2021/0201329 A1* 7/2021 van den Berg ........ G06Q 50/40

OTHER PUBLICATIONS https://www.atmosfair.de/en/corporate_services/.
1 Extended European Search Report from European application No. 21157671.5 dated May 18, 2021.

* cited by examiner

US 12,080,109 B2

PROCESSES FOR OFFSETTING A CARBON FOOTPRINT OF A MULTISTAGE TRIP AND FOR THE LIFECYCLE OF A VEHICLE

FIELD OF THE INVENTION

The present invention relates generally to determining and offsetting a carbon footprint, or impact, from a trip, and more specifically to such methods for multi-stage trips, as well as to methods for determining a carbon footprint of a vehicle based on the entire lifecycle of the vehicle.

BACKGROUND

As the awareness of environmental issues has grown, travelers have often sought out ways to evaluate an environmental impact of their activities, and if possible, offset a portion or all of the environmental impact.

For example, some current processes provide options for a traveler to offset the carbon footprint generated in a single stage of the travel plans, i.e., a flight. However, most travel plans involve many more stages. Thus, such process does not provide an easy and straightforward approach to evaluate and address the carbon impact of the entire travel plan. Rather, a traveler may be required to undertake a piecemeal approach if they want to offset more than just one stage of their trip. Therefore, evaluating and addressing the carbon impact of an entire trip, or even multiple stages of the trip, may be a cumbersome task.

With respect to the stages of the travel that utilize vehicles, like an aircraft or a car, a carbon footprint of a stage is often calculated based on the distance traveled. After determining the carbon footprint based on the distance traveled, the traveler is provided with the opportunity to pay a sum of money to offset the carbon impact of that stage. The offset could be in the way of a company purchasing carbon credits or in the money being donated to a charity or other company that acts to offset carbon creation.

However, calculating the impact of the vehicle based only on the carbon footprint while the vehicle is in use does not provide an indication of the entire environmental impact of the vehicle. In addition to underestimating the carbon footprint, such a process does not necessarily provide the appropriate information to manufacturer and suppliers of components for the vehicle to fully appreciate the environmental impact of all aspects of the vehicle. This may stifle innovations addressing the carbon footprint for the vehicle in the other stages of the vehicle's life cycle beyond the usage stage.

Therefore, there is a need for new processes for understanding the carbon impact of a vehicle over its entire lifetime so that a more accurate carbon impact may be determined. The newly determined carbon impact may be used by both the manufacturer and its suppliers and by the consumers/travelers using the vehicle. Furthermore, there is a need for a more complete approach to allowing a traveler to offset the carbon footprint of an entire trip.

SUMMARY

Various processes have been invented for determining environmental impacts, like a carbon footprint or carbon dioxide emission impact. These processes are particularly beneficial in allowing a traveler to fully appreciate the carbon footprint of their entire trip. Additionally, these processes are also useful in providing a more accurate representation of the environmental impact from a vehicle beyond the impact from using the vehicle.

At least one new process for determining the carbon footprint of or a multistage trip has been invented. Such a process allows a traveler to make more informed decisions above various aspects of the travel so as to address the complete carbon footprint of the travel.

Furthermore, at least one new process for determining the carbon impact of a vehicle has been invented. In the new process, the carbon impact from multiple stages of the entire lifecycle of the vehicle is determined and may be used to determining an entire carbon footprint for the vehicle. By using the entire lifecycle, manufacturers of the vehicle may be able to address the carbon footprint from various stages of the vehicle's lifecycle that may have otherwise been ignored when the carbon footprint determination only focused on the usage stage of the vehicle. Additionally, with respect to vehicles, like cars and aircraft, such a process allows travelers to more accurately offset the carbon footprint associated with the travel.

Therefore, in at least one aspect the present invention may be characterized as providing a process to offset an environmental impact of a multi-stage trip by: determining a sustainability level for a trip; separating the trip into a plurality of stages; determining a carbon dioxide emission impact for each stage; obtaining a total carbon dioxide impact based on the carbon dioxide emission impact for each stage; providing one or more options to achieve the sustainability level for the trip; and, comparing an adjust total carbon dioxide impact, based on one of more of the options being selected, to the sustainability level.

The process may include acquiring one or more filters, wherein at least one of the one of more options to achieve the sustainability level for the trip are based on at least one filter.

The one or more options to achieve the sustainability level for the trip may include obtaining a carbon dioxide credit, making a monetary donation, changing a stage from the plurality of stages to one with a lower carbon dioxide emission impact.

In another aspect, the present invention may be generally characterized as providing a process for determining a carbon dioxide emission impact of a trip in a vehicle based on an entire lifecycle of the vehicle by: determining a first carbon dioxide emission impact from at least a portion of a production stage of the vehicle; determining a second carbon dioxide emission impact from at least a portion of a usage stage of the vehicle; determining a third carbon dioxide emission impact from at least a portion of an end of life stage of the vehicle; and, determining a total carbon dioxide emission impact based on the first carbon dioxide emission impact, the second carbon dioxide emission impact, and the third carbon dioxide emission impact.

The process may include offsetting at least a portion of the total carbon dioxide emission impact. The portion of the total carbon dioxide emission impact may be offset by obtaining a carbon dioxide credit or by a monetary donation.

In still another aspect, the present invention may be characterized as providing a process to offset an environmental impact of a trip in a vehicle by: determining a first environmental impact from at least a portion of a production stage of the vehicle; determining a second environmental impact from at least a portion of a usage stage of the vehicle; determining a third environmental impact from at least a portion of an end of life stage of the vehicle; determining a first offsetting option to offset at least a portion of the first environmental impact; determining a second offsetting option to offset at least a portion of the second environmental impact; determining a third offsetting option to offset at least a portion of the third environmental impact; and, undertaking the first offsetting option, the second offsetting option, the third offsetting option, or a combination thereof to offset a portion of the environmental impact from using the vehicle. The vehicle may be an aircraft.

The portion of the usage stage, for which the second environmental impact is determined, may be a trip of the vehicle. The portion of the usage stage, for which the second environmental impact is determined, may be a repair operation of the vehicle.

The process may include determining a fourth offsetting option to offset at least a portion of each of the first, the second, and the third environmental impacts.

It is contemplated that the first offsetting option, the second offsetting option, and the third offsetting option are offered to a plurality of different of classes of entities interacting with the vehicle. The plurality of different of classes of entities interacting with vehicle may be a designer of the vehicle, a tester of the vehicle, a manufacturer of the vehicle, a supplier of a component for the vehicle, a purchaser of the vehicle, an operator of the vehicle, or a user of the vehicle. Additionally, undertaking the first offsetting option, the second offsetting option, the third offsetting option, or a combination thereof to offset a portion of the environmental impact from using the vehicle may occur after one of the entities from plurality of different of classes of entities interacting with the vehicle selects one of the offsetting options.

The environmental impact of the vehicle may be a carbon dioxide emission impact. One of the offsetting options may be obtaining a carbon dioxide credit or making a monetary donation.

These aspects, embodiments, and features, which may be combined in any manner, are described in more detail below and in the attached drawings.

DESCRIPTION OF THE DRAWINGS

One or more exemplary embodiments of the present invention will be described below in conjunction with the following drawing figure, in which.

DETAILED DESCRIPTION

As noted above, new processes have been invented for allowing individuals and companies to address carbon dioxide emission impact or carbon footprint. In some aspects, the present processes are directed at determining the carbon dioxide emission impact so that a traveler is able to fully appreciate the carbon footprint of their entire trip. In various aspects, these present processes provide a more accurate representation of the impact of the use of the vehicle by determining a carbon dioxide emission impact for the entire lifecycle of the vehicle.

With these above general aspects of the present invention in mind, one or more embodiments of the present invention will be described with the understanding that the following description is not intended to limit the present disclosure.

Figure 1:
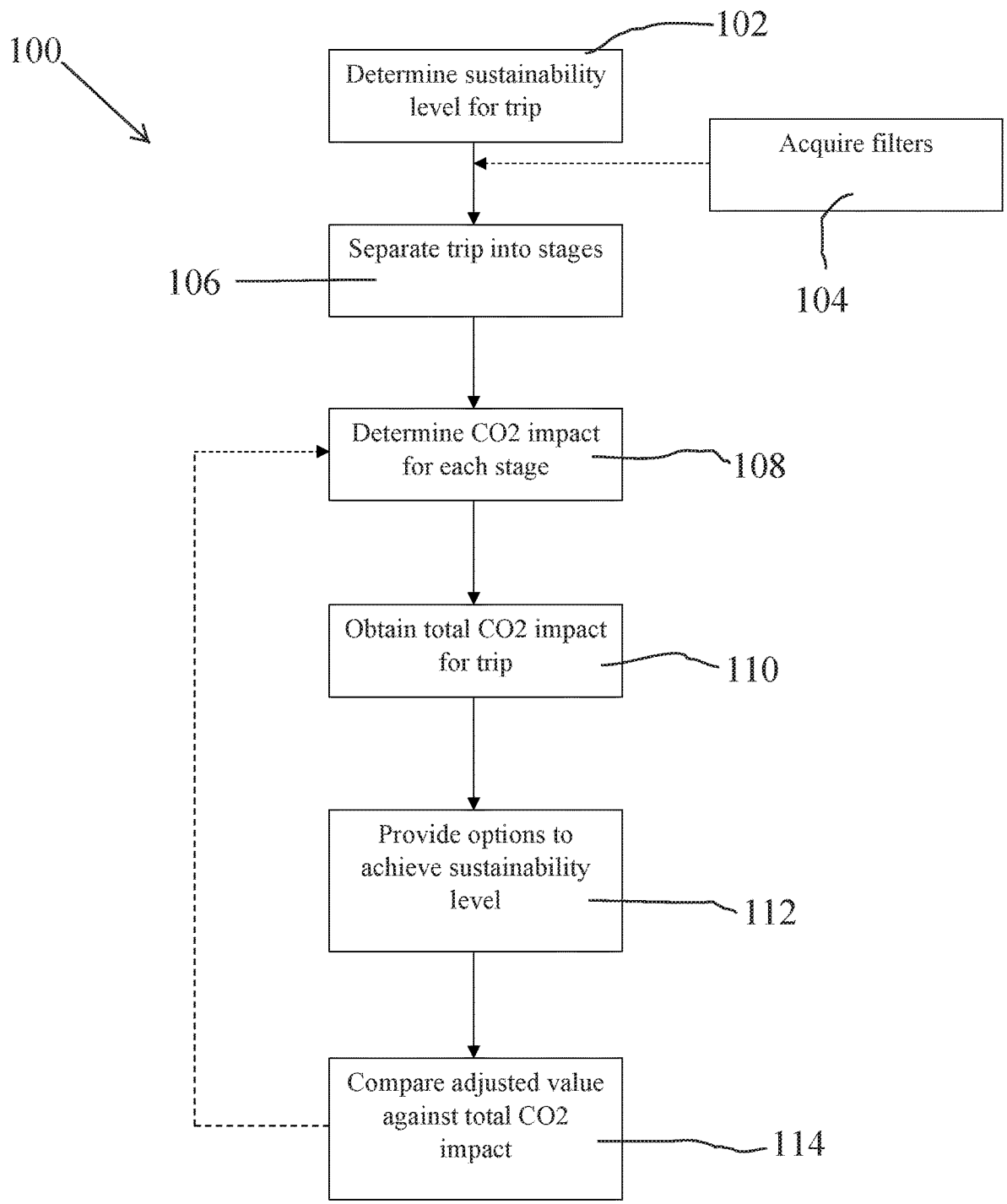
FIG. 1 is a process flow diagram of a process according to one or more aspects of the present invention; and, FIG. 2 depicts another process flow diagram of a process according to one or more aspects of the present invention.

As shown in FIG. 1, according to one aspect, a process 100 is provided for determining the carbon dioxide emission impact from a multi-stage trip. In a first step 102 of the process 100, a sustainability level for the trip is determined. The sustainability level is between 100% (representing a fully sustainable trip) to 1% representing at least some level of sustainability. This sustainability level may be determined by input received from a traveler.

Additionally, the process 100 preferably includes a step of acquiring various filters 104. The traveler may provide information creating various filters to be used in later steps of the process. For example, the traveler may want to minimize or eliminate the reliance on cars. Accordingly, a filter may be created based on receiving this information from the traveler. Exemplary filters include, for example, no walks longer than 10 minutes or not longer than 1 km, maximum amounts of travel, maximum costs for travel, as well as destination, location, time, start and end times. Other filters may include brand of airline, hotel, or other commonly applied filters.

The process 100 includes a step 106 of separating the trip into a plurality of stages, or legs, of the trip. The stages may include, for example, a trip to airport A, a flight from airport A to airport B, a trip from airport B to a hotel. Other stages might include, a length of stay at the hotel, various excursions, or trips to restaurants.

Some of the stages may also include sub-stages. For example, with an excursion or a trip to a restaurant, the process 100 may break down, or separate, that stage into sub-stages, like travel to the restaurant, eating at the restaurant, and travel back from the restaurant.

For each stage, the process 100 at a step 108 determines a carbon footprint of that stage. For some stages, the determination is based on calculating distance traveled, for example, via car or aircraft. However, as discussed below, aspects of the present invention involve a method to determine a carbon dioxide emission impact of a vehicle trip by determining the impact for the entire life of the vehicle. In other stages, the determination step 108 may be made by accessing one or more databases, either external or internal, that include stored values for the various stages. For example, a hotel may provide information determining a carbon impact for a stay by a guest, or a restaurant may provide information on a carbon impact of a meal eaten at the restaurant.

Furthermore, as noted above, some stages may be separated into sub-stages. Accordingly, the determination of the carbon footprint of such a stage may include determinations for each of the sub-stages. Then those individual determinations for the sub-stages are combined to provide the determination for the sub-stage.

Once the carbon footprint of each stage is determined, in step 110 of the process 100, a total calculated value (i.e., the sum of all of the values determined in step 108) is obtained. In a subsequent step 112, options are provided to allow the traveler to achieve the sustainability level of step 102. The different options may be provided with various information, such as cost, time, carbon impact, etc.

For example, compensation means may be offered to allow the traveler to pay to offset the carbon footprint to achieve the sustainability level. The money paid may offset the carbon footprint by being used to purchase carbon credits. Alternately, the money could be used to pay for an activity (e.g., plant a tree) that lower carbon impact. Similarly, the money may be donated to a charity that undertakes activities that lower carbon impact.

Additionally, or alternatively, options for various stages of the trip may be offered which reduce the total calculated value to achieve the sustainability level. For example, if the calculation included a trip in a car to an airport, it may be determined that an option for that stage would be public transportation which would have a lower carbon impact. Accordingly, the option to take the public transportation could be offered as a way to achieve the sustainability level. Other such offerings, for example, could include sail boats, bikes, walking, etc.

After one or more of the various options have been selected, the process 100 includes a step 114 of comparing the total calculated value with an adjusted value which takes into account the options provided in step 112 and selected by the traveler. In some cases, like the donation of money, or the purchasing of carbon dioxide credits, the adjusted value may be calculated by lowering the total calculated value by the appropriate value.

In other cases, the adjusted value may be determined by repeating steps 108 and 110 of the process 100 and changing one or more stages based on the selected options. For example, if the total calculated value determined at step 110 was based on a stage that included travel in a car from a hotel to the airport, and the option selected in step 112 was to walk to a train station and use public transportation, the adjusted value will be based on a sum of the determinations at step 108 but with the impact of the walk/train ride instead of the car ride.

In either case, the adjusted value may be compared against the total calculated value to determine if the sustainability level is achieved or not. One of more of the steps of the process 100 may be repeated iteratively to continually determine a new adjusted value in response to option(s) selected in response to step 112 of the process 100.

The steps of the process 100 may be accomplished through one or more controllers. As will be appreciated, a "controller", as used throughout this application, means a computer or processing unit that includes one or more processors configured to cause a series of steps to be performed so as to implement methods such that instructions, when executed by a computing device or other programmable apparatus, may cause the functions/acts/steps specified in the methods described herein to be executed. The processors may be, for example, any type of general-purpose processor, microprocessor, controller, microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The controller may also include memory that is any suitable known or other machine-readable storage medium. The memory may be a non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the controller such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may include any storage means (e.g., devices) suitable for retrievably storing the computer-executable instructions executable by the processor.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various configurations, arrangements, or embodiments.

Additionally, controllers may utilize communications links to communicate and exchange information, including various network protocols such as TCP/IP, Ethernet, FTP, HTTP and the like, and of various wireless communication technologies such as GSM, CDMA, Wi-Fi, and WiMAX.

The process 100 may be implemented in an internet or web-based service, via a cellular phone application (i.e., an "app"), or in other ways. Additionally, the processes 100 may be a self-sufficient platform, or they may be integrated into existing platforms and applications.

By providing such a process 100, the present invention allows travelers to more accurately make travel plans for multiple stages of a trip focusing on a defined sustainability level, as well as cost.

As discussed above, in various aspects the process 100 of FIG. 1 determines a carbon footprint of a stage of a trip that relies on a vehicle. As explained above, the process may determine the carbon footprint of such a stage based on a distance travelled in the vehicle. However, the present invention also provides a process that more accurately determines the carbon footprint of a vehicle based on its entre lifecycle.

Figure 2:
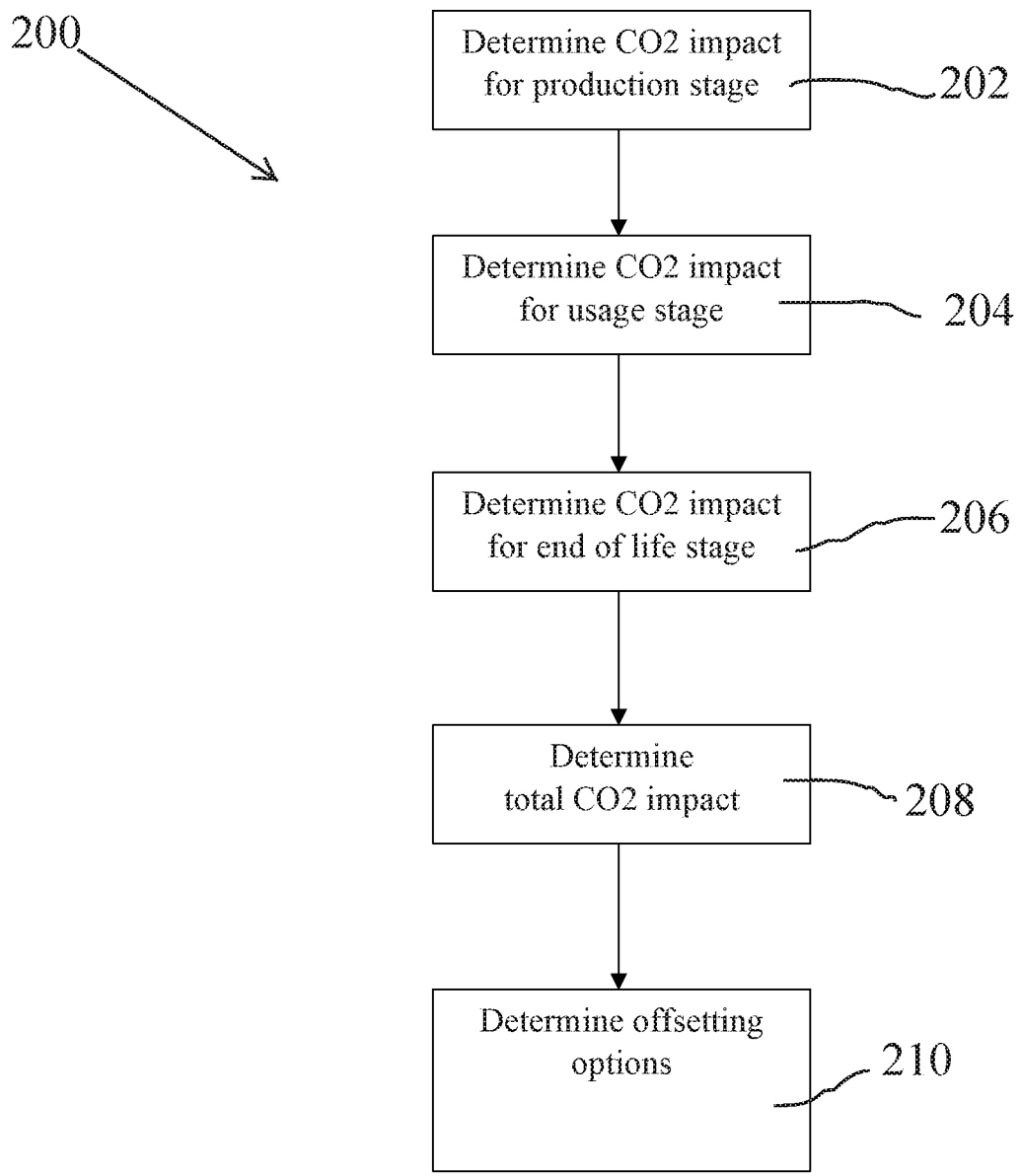

Accordingly, turning to FIG. 2, a process 200 for calculating the carbon dioxide emission impact of the vehicle based on the entirety of the lifecycle of the vehicle is depicted. Specifically, the process 200 analyzes at least three stages of the vehicle: production stage 202, usage stage 204, and the end of life cycle stage 206. For each of these stages, the process determines a carbon dioxide emission impact of that stage. Once the carbon dioxide emission impact is determined for each of the stages, a total carbon dioxide emission impact of the vehicle, in step 208, may be determined.

The total carbon dioxide emission impact determined in step 208 may be used in the determination of the impact of the vehicle on a stage of a trip in the process 100 shown in FIG. 1. For example, the carbon dioxide emission impact for a specific trip in the vehicle may be based on a percentage of the total carbon dioxide emission impact determined in step 208. Alternatively, the carbon dioxide emission impact for a specific trip in the vehicle may be based on the actual usage plus a percentage of the total carbon dioxide emission impact determined in step 208. In either case, the determination can more accurately reflect the carbon impact resulting from the use of the vehicle.

Additionally, the total carbon dioxide emission impact determined in step 208 may be used to address the carbon footprint that may not have otherwise been considered. For example, while current innovations may be focused on the usage stage of the vehicle (e.g., more efficient engine, less gasoline consumption, etc.), it may be determined that certain portions of the production stage have a high carbon dioxide emission impact (i.e., obtaining natural resources, production processes). Thus, this source of increasing the vehicle's carbon footprint may be addressed by innovation to lower the vehicle's total carbon dioxide emission impact in a way that might not be appreciated when only analyzing the usage stage of the vehicle.

The production stage includes activities relating to the conception, design, resource extraction, manufacturing, assembly, testing, and commissioning phases as well as others. For example, many vehicles are made, directly or include components made from, natural resources. The present processes analyze and determine a carbon dioxide emission impact associated with this portion of the production stage.

Additionally, the usage stage includes activities relating to demonstrating, delivery, storage, operating, maintaining, repairing, transporting, cleaning, refitting, and using the vehicle. For example, many vehicles require maintenance. The present processes take into consideration the carbon dioxide emission impact of various aspects of the maintenance, such as disposal of various materials, travel to and from repair facilities, carbon impacts of support vehicles.

Finally, the end of life stage includes activities relating to decommissioning, transporting, disassembly, recycling, disposing, de-toxifying or neutralizing, storing, the vehicle. For example, some components of the vehicle may be recycled, reused, or repurposed, thus lowering the carbon dioxide emission impact of the vehicle.

After analyzing the various stages and determining the total carbon dioxide emission impact determined in step 208, the process 200 may include a step 210 of determining one or more offsetting actions that could lower or offset the carbon dioxide emission impact of the vehicle.

Exemplary offsetting options include making a monetary donation or obtaining a carbon dioxide credit. In some embodiments, the offsetting actions are available to various users or classes of entities interacting with the vehicle, like a designer of the vehicle, a tester of the vehicle, a manufacturer of the vehicle, a supplier of a component for the vehicle, a purchaser of the vehicle, an operator of the vehicle, and a user of the vehicle.

By determining a carbon dioxide emission impact for the entire life span of the vehicle, a traveler may be provided with a more accurate reflection of the carbon dioxide emission associated with the traveler's actions. Thus, any offsetting actions are more likely to more accurately offset the traveler's actions. Additionally, such a determination may be used to foster and develop new innovations that lower the overall carbon dioxide emission for non-usage stages of the vehicle. Further, although not required, such a process may be used in the other processes described herein relating to determining and planning travel based on the carbon dioxide emission impact for the entire trip.

While at least one exemplary embodiment of the present invention(s) is disclosed herein, it should be understood that modifications, substitutions and alternatives may be apparent to one of ordinary skill in the art and may be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer implemented process by one of more processors to offset an environmental impact of a trip undertaken by a user of a vehicle, the process comprising:
   determining a first environmental impact from at least a portion of a production stage of the vehicle, wherein the vehicle comprises an aircraft to be used in the trip;
   determining a second environmental impact from at least a portion of a usage stage of the vehicle;
   determining a third environmental impact from at least a portion of an end of life stage of the vehicle;
   determining a total environmental impact based on the first environmental impact, the second environmental impact, and the third environmental impact;
   determining a first offsetting option for the trip to offset at least a portion of the first environmental impact;
   determining a second offsetting option for the trip to offset at least a portion of the second environmental impact;
   determining a third offsetting option for the trip to offset at least a portion of the third environmental impact;
   offering the first offsetting option, the second offsetting option, and the third offsetting option to the user of the vehicle;
   selecting, by the user of the vehicle, the first offsetting option, the second offsetting option, the third offsetting option, or a combination thereof to offset a portion of the environmental impact of the trip;
   when the first offsetting option is selected, determining an adjusted first environmental impact from the production stage of the vehicle;
   when the second offsetting option is selected, determining an adjusted second environmental impact from the usage stage of the vehicle;
   when the third offsetting option is selected, determining an adjusted third environmental impact from the end of life stage of the vehicle;
   iteratively and continually determining an adjusted total environmental impact based on the adjusted environmental impacts of each of the selected first, second and third offsetting option; comparing the adjusted total environmental impact against a desired total environmental impact;
   performing the each of the selected offsetting option to offset the portion of the environmental impact of the trip; and
   undertaking, by the user of the vehicle, the trip with the vehicle to achieve a sustainability level with the desired total environmental impact.

2. The process of claim 1, wherein the portion of the usage stage, for which the second environmental impact is determined, comprises the trip of the vehicle.

3. The process of claim 1, wherein the portion of the usage stage, for which the second environmental impact is determined, comprises a repair operation of the vehicle.

4. The process of claim 1, wherein the environmental impact of the vehicle comprises a carbon dioxide emission impact.

5. The process of claim 4, wherein one of the offsetting options comprises obtaining a carbon dioxide credit.

6. The process of claim 1, wherein one of the offsetting options comprises making a monetary donation.

* * * * *